(No Model.) 6 Sheets—Sheet 1.
M. JOHNSON.
ROTARY ENGINE.

No. 447,831. Patented Mar. 10, 1891.

Witnesses:
Ella Nemett.
John L. Jackson.

Inventor:
Mathew Johnson
by Bond, Adams & Jones
attys

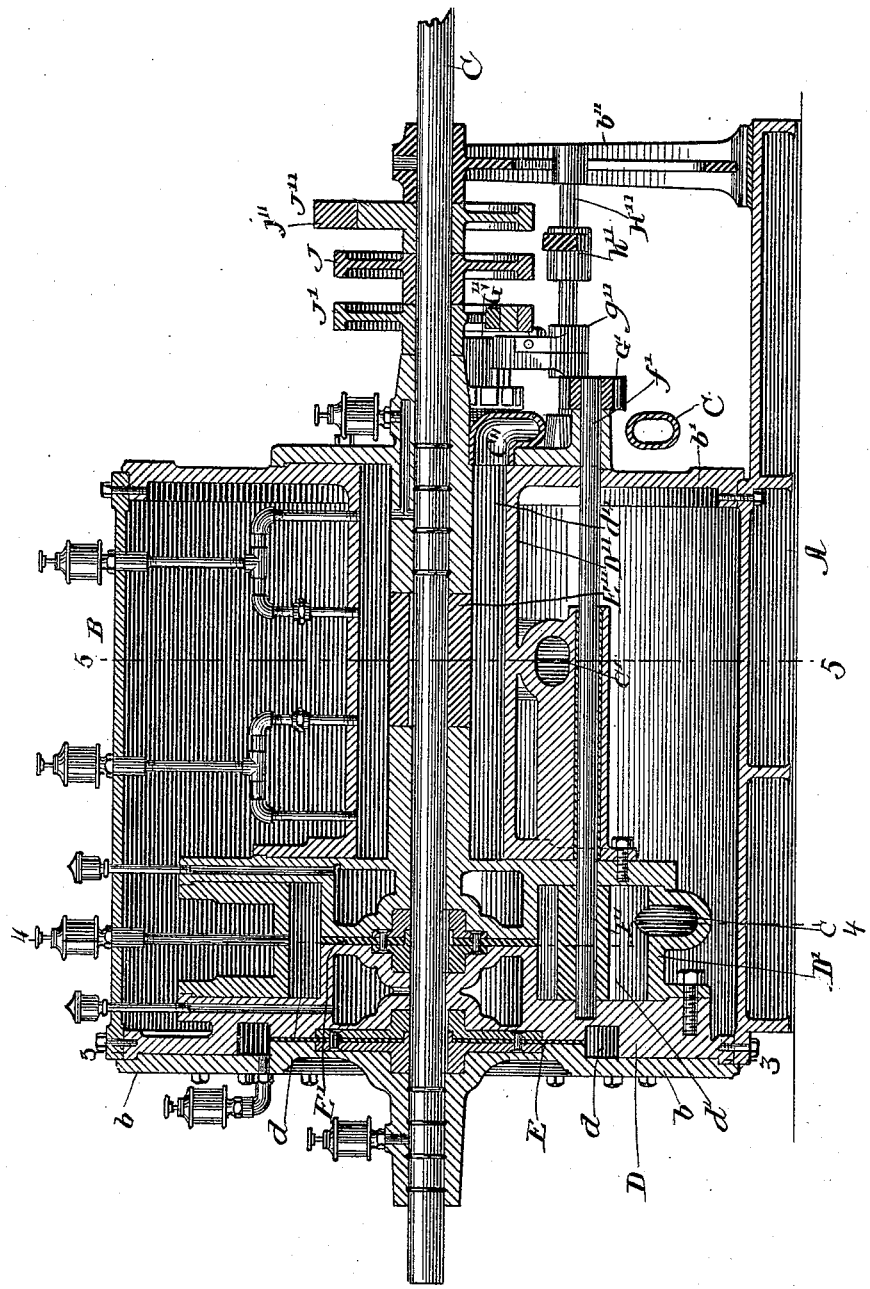

(No Model.) 6 Sheets—Sheet 3.
M. JOHNSON.
ROTARY ENGINE.
No. 447,831. Patented Mar. 10, 1891.
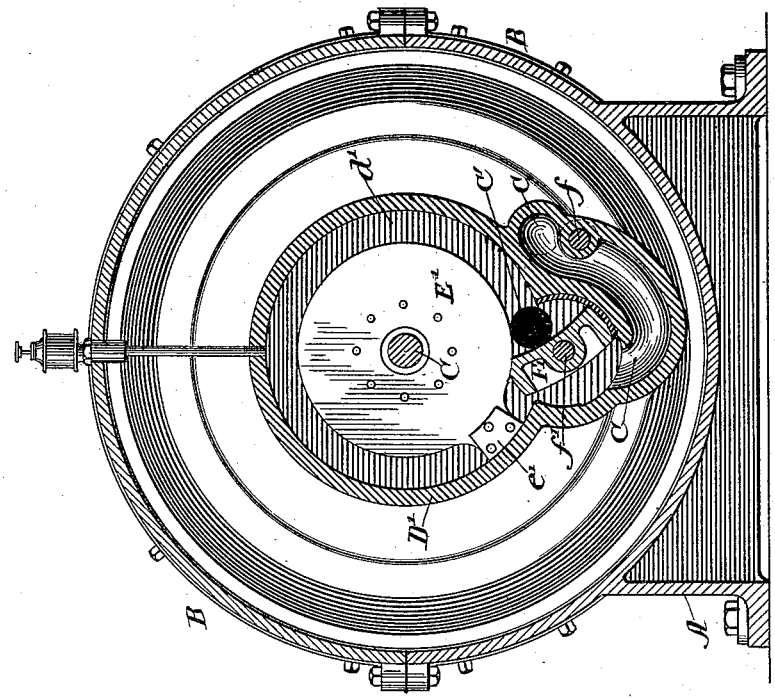
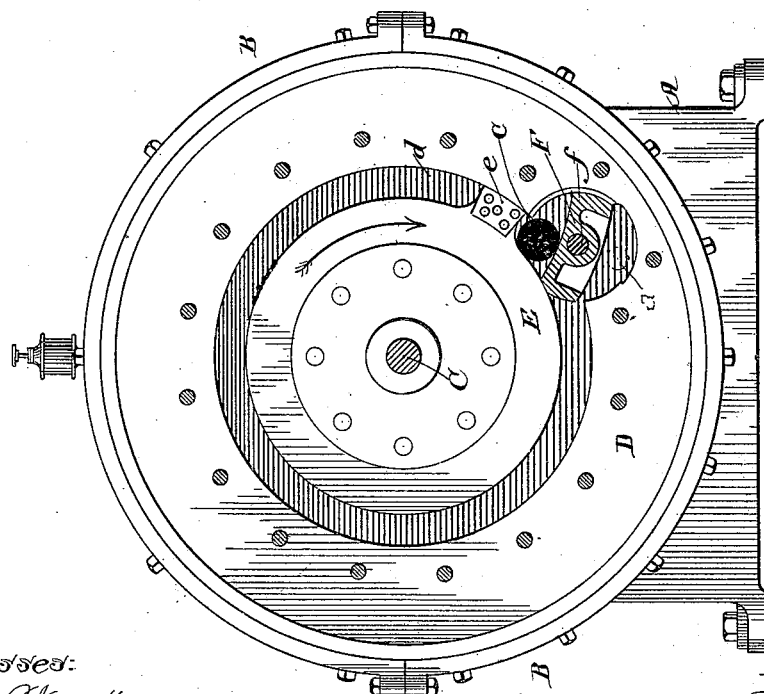
Witnesses:
Ella C. Nemett.
John L. Jackson.
Inventor:
Mathew Johnson
by Bond, Adams & Jones
attys (No Model.) 6 Sheets—Sheet 4.

M. JOHNSON.
ROTARY ENGINE.

No. 447,831. Patented Mar. 10, 1891.

Witnesses:
Ella Nemett
John L. Jackson.

Inventor:
Mathew Johnson
by Bond, Adams & Jones
Attys (No Model.) 6 Sheets—Sheet 5.

M. JOHNSON.
ROTARY ENGINE.

No. 447,831. Patented Mar. 10, 1891.

Witnesses:
Ella C. Nemett.
John L. Jackson.

Inventor:
Mathew Johnson
by Bond, Adams & Jones
attys

THE NORRIS PETERS CO., PHOTO-LITHO., WASHINGTON, D. C.

(No Model.) 6 Sheets—Sheet 6.
M. JOHNSON.
ROTARY ENGINE.
No. 447,831. Patented Mar. 10, 1891.
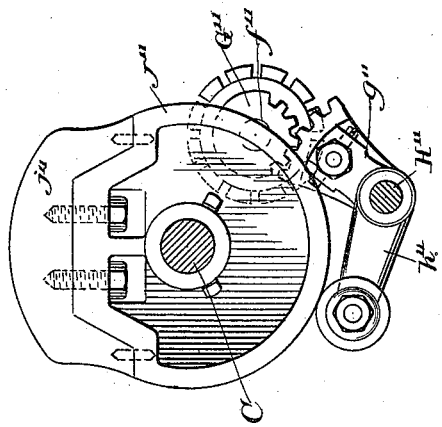
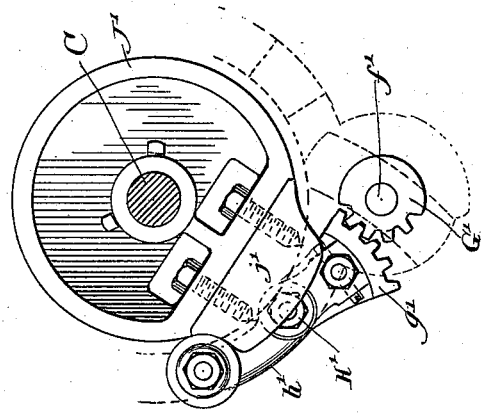
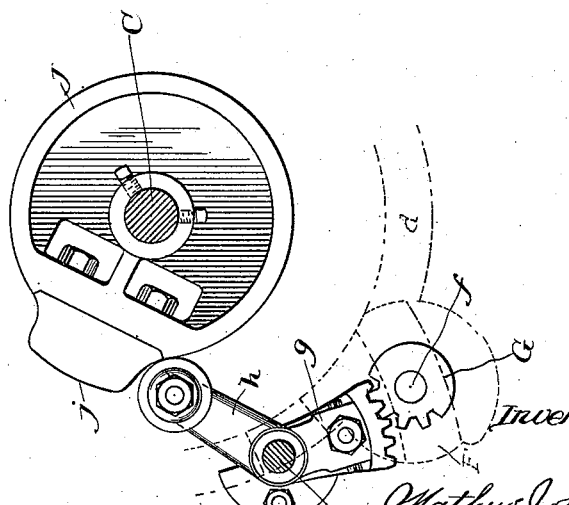
Witnesses:
Ella Nemett.
John D. Jackson.
Inventor:
Mathus Johnson
by Bond, Adams & Jones
attys

UNITED STATES PATENT OFFICE.

MATHEW JOHNSON, OF CHICAGO, ILLINOIS.

ROTARY ENGINE.

SPECIFICATION forming part of Letters Patent No. 447,831, dated March 10, 1891.

Application filed May 20, 1890. Serial No. 352,506. (No model.)

*To all whom it may concern:*

Be it known that I, MATHEW JOHNSON, residing in Chicago, county of Cook, and State of Illinois, and a citizen of the United States, have invented a new and useful Improvement in Rotary Engines, of which the following is a specification, reference being had to the accompanying drawings, in which—

Figure 1:
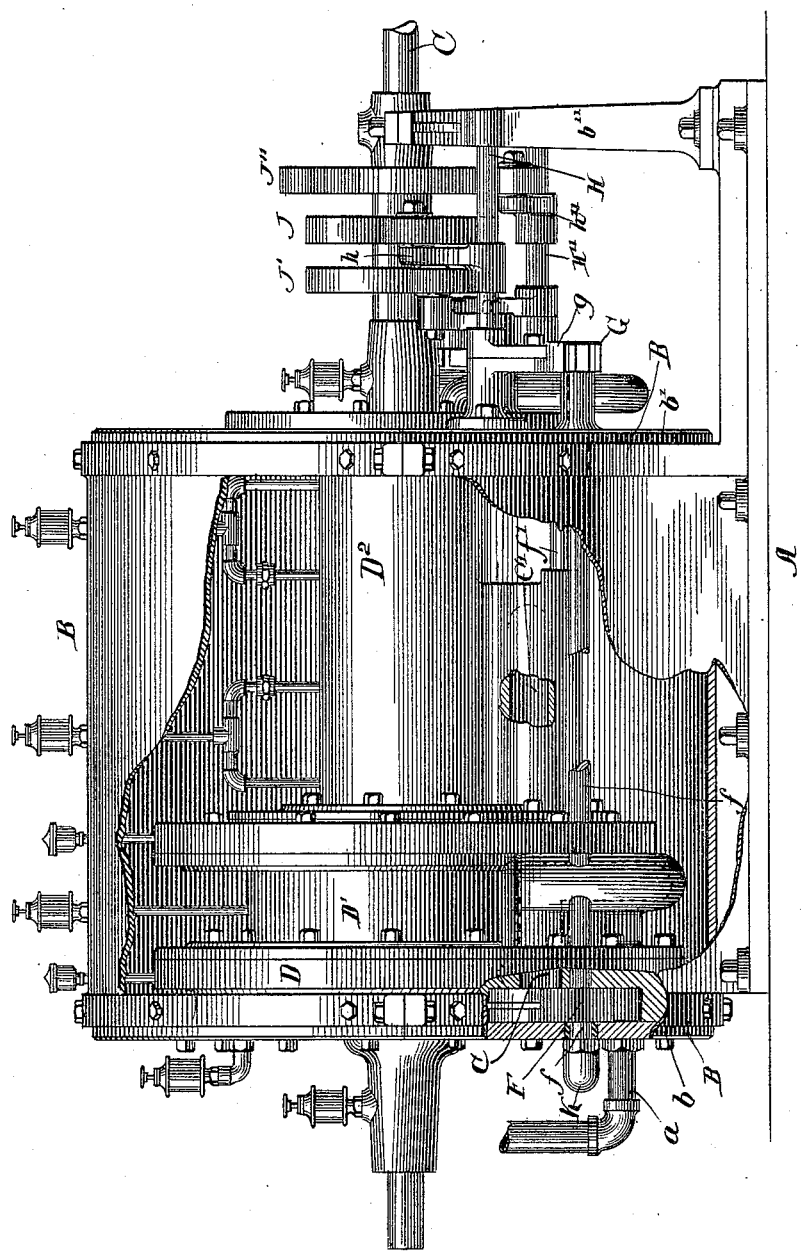
Figure 6:
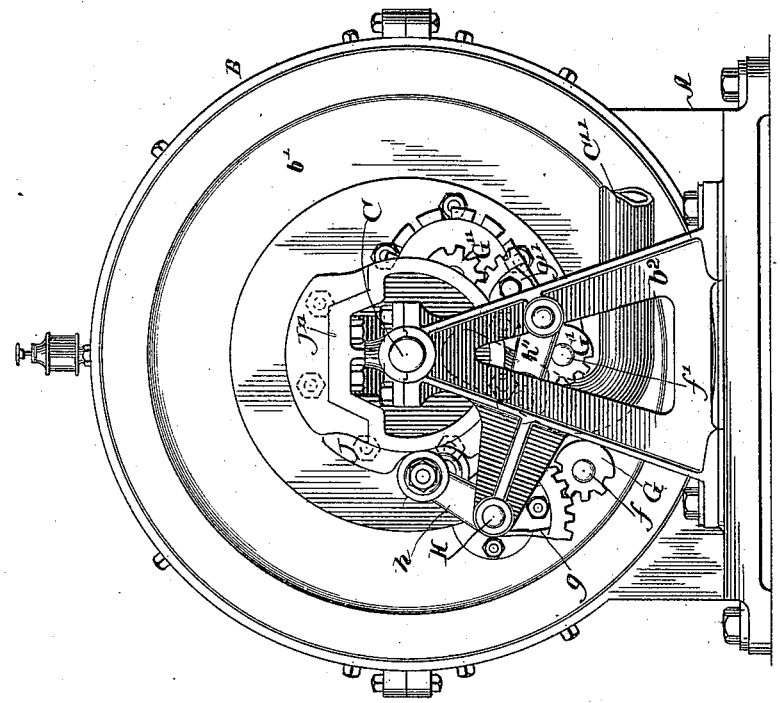
Figure 5:
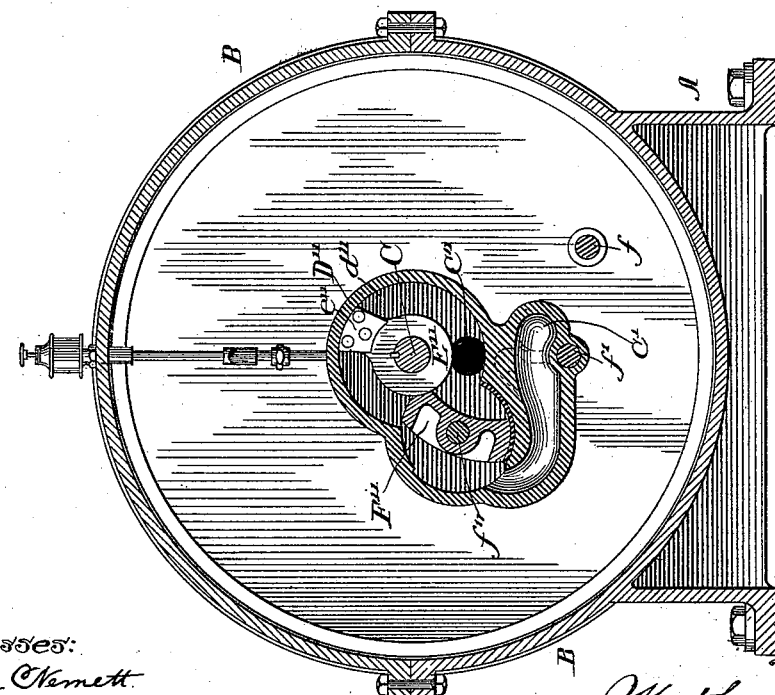
Figure 7:
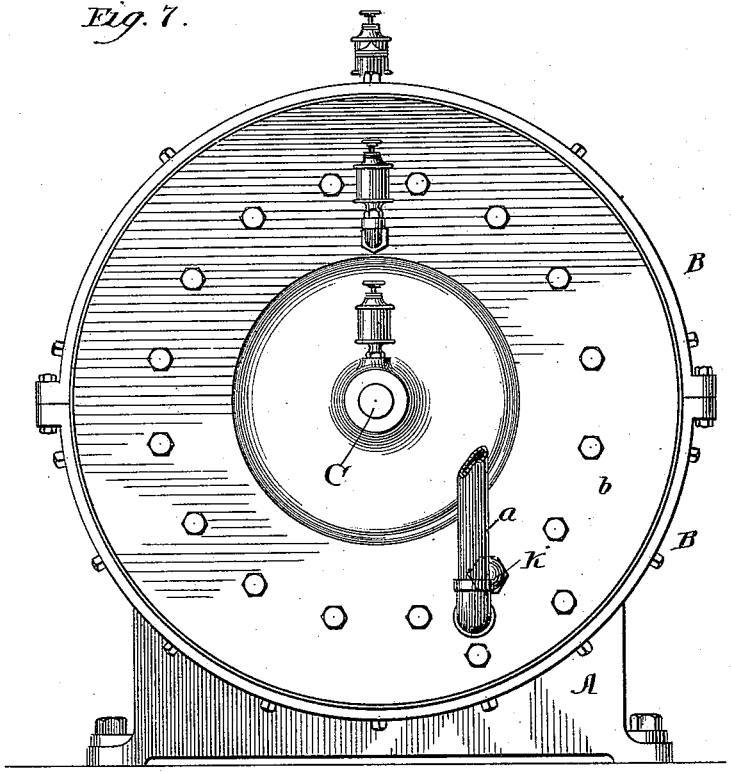
Figure 8:
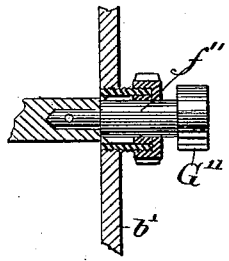
Figure 9:
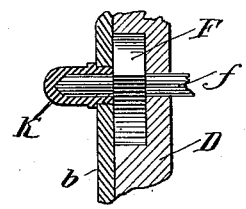

Figure 1 is a side elevation, part of the casing being broken away. Fig. 2 is a central longitudinal section. Fig. 3 is a vertical section at line 3 3 of Fig. 2. Fig. 4 is a vertical section at line 4 4 of Fig. 2. Fig. 5 is a vertical section at line 5 5 of Fig. 2. Fig. 6 is an end elevation showing the valve-gear. Fig. 7 is an end elevation showing the opposite end from Fig. 6. Fig. 8 is a detail showing a bearing for the valve-shaft of the third cylinder. Fig. 9 is a detail showing a bearing for the valve-shaft with the valve of the first cylinder. Fig. 10 is a detail showing the valve-gear for operating the valve of the first cylinder. Fig. 11 is a detail showing the valve-gear for operating the valve of the second cylinder, and Fig. 12 is a detail showing the valve-gear for operating the valve of the third cylinder.

This invention relates to rotary engines of the class known as concentric piston-engines. The objects of this invention are to construct a multiple rotary engine, to construct a rotary engine in which the steam can act expansively, to construct a multiple rotary engine in which the steam of the second or third cylinders will have a less distance to travel than in the preceding cylinder, to provide improved gear for operating a rotary engine of this class, and to provide other improvements, hereinafter set forth. I accomplish these objects as illustrated in the drawings and as hereinafter described.

That which I claim as new will be pointed out in the claims.

In the drawings, A represents the base, which may be cast in any suitable form to support the parts.

B represents a casing, which is preferably made cylindrical in form and is supported upon the base A. As shown, the casing B is made in two sections, one of which is integral with the base A and the other is secured to the first section by flanges and bolts. One end of the casing B is closed by a head $b$ and the other by a head $b'$, which is provided with a flange adapted to be bolted to the casing B.

C is the main shaft. This shaft is supported in suitable bearings in the heads $b$ $b'$ and a standard $b''$, as best shown in Fig. 2.

D is the first cylinder. This cylinder is bolted to the casing B and to the head $b$.

$d$ is the steam-chamber, which is formed in the cylinder D, the head $b$ forming one side of the chamber. This chamber in an engine which I have designed is about twenty-four (24) inches in diameter and is about two (2) inches square in cross-section. I do not limit my invention, of course, to any particular dimensions; but the above and the figures which I will hereinafter give will give the dimensions of the engine I have designed and will illustrate the proportions which I believe to be best.

E (see Fig. 3) is a rotating disk, which is secured upon the shaft C. This disk E is provided with a piston-head $e$, fitted in the first steam-chamber $d$. I do not limit my invention to any particular form of disk and piston-head, but the construction shown will be found a very suitable one.

F is a valve for dividing the first chamber $d$. This valve F is secured upon the valve stem or shaft $f$, which extends through the casing B, as shown in Fig. 3. The end of the valve F, which swings across the chamber $d$, is longer than the opposite end, so that the pressure of the steam upon the longer end will hold the valve in position. Steam is admitted into the valve-chamber on one side of the valve F from the steam-generator through the steam-pipe $a$. It is exhausted on the opposite side through the pipe $c$, as shown in Fig. 3. The admission of steam through the pipe $a$ will rotate the piston-head $e$ and disk E in the direction indicated by the arrow in Fig. 3. The valve F is operated by means of valve-gear connected with the stem or shaft $f$. Upon the outer end of the shaft $f$ is secured a geared wheel or disk G, as shown in Figs. 1 and 10, and upon a shaft H, mounted in suitable bearings upon the head $b'$ and standard $b''$, is secured a segment-arm $g$, adapted to engage with the geared wheel or disk G. Upon the shaft C is secured a cam-disk J, and upon the shaft H is secured an arm $h$, provided with a roller adapted to engage with the cam-disk J. The cam-disk J is circular for nearly its entire diameter. The cam-surface *j* is of such form and size to operate the parts, as hereinafter set forth. The shaft C and cam-disk J and piston-disk E rotate together. The cam-disk J is so arranged upon the shaft C that its cam *j* will engage with the roller upon the arm *h*, rocking the arm *h*, shaft H, and segment *g*, thereby rocking the disk G, shaft *f*, and valve F upon the shaft *f* at the time when the piston *e* approaches the valve F, thereby closing the valve F and permitting the piston *e* to pass the valve F. As soon as the valve *e* passes the valve F in the chamber *d* the roller upon the arm *h* will pass down from the cam *j*, thereby opening the valve at that instant. The disk J is circular the greater part of its circumference, so that the valve F will not be moved, but will occupy the position shown in Fig. 3. The passing of the roller on the arm *h* up onto the cam *j* closes the valve F. The face of the cam *j* is a segment of a circle, so that while the roller is passing it the valve F will remain closed and when the roller passes down from the cam *j* the valve will open.

In order to give the shaft or valve-stem *f* a proper bearing in the head *b*, I provide a cap K, which is secured in the head and gives a long bearing or support for the shaft *f*, as shown in Fig. 9.

D' is the second cylinder. This cylinder D' is secured to the first cylinder and to the third cylinder, as hereinafter set forth.

*d'* (see Fig. 4) is a steam-chamber, which is formed in the second cylinder D'. This chamber in the engine which I have designed is about fifteen inches in diameter and is eight inches wide, and its height is about two inches.

E' is a rotating disk, which is also secured upon the shaft C. This disk E' is provided with a piston-head fitted in the second steam-chamber *d'*.

F' is a valve for dividing the second steam-chamber *d'*. This valve F' is secured upon a valve stem or shaft *f'*, which extends through the casing B. The construction of the valve F' is the same as that of the valve F. Steam is admitted to the valve F' from the exhaust-port of the first cylinder through the steam-passage *c*. The steam is exhausted from the chamber *d'* through the exhaust *c'*. The piston *e'* in Fig. 4 is shown as having just passed the valve F', and the piston *e* in Fig. 3 is shown as approaching the valve F, in order to illustrate the different positions of the parts. Upon the outer end of the shaft *f'* is secured a wheel or disk G', as shown in Fig. 11, and upon the shaft H', mounted in a suitable bearing upon the head *b'*, is secured a segment-arm *g'*, adapted to engage with the geared wheel or disk G'. Upon the shaft C is secured a second cam-disk J', and upon the shaft H' is secured an arm *h'*, provided with a roller adapted to engage with the cam-disk J'. The cam-disk J' is similar in form to the cam-disk J, and the operation of the parts above enumerated is similar to that of the corresponding parts for operating the first valve F of the first cylinder. The width of the cam *j'* of the cam-disk J', however, is greater than that of the cam *j*, because the valve F' must be closed for a longer period than the valve F, as the piston-head *e'* rotates upon a shorter radius than the piston-head *e*.

D'' is the third cylinder. This cylinder is secured to or formed with the head *b'* and at its opposite ends is bolted or secured to the cylinder D'.

*d''* (see Figs. 2 and 5) is the steam-chamber, which is formed in the third cylinder D''. This chamber in an engine which I have designed is about nine inches in diameter, twenty-four inches wide, and its interior radius is about two inches.

E'' (see Fig. 5) is a rotating disk, which is secured upon the shaft C. The disk E'' is provided with a piston-head *e''*, fitted in the third steam-chamber *d''*.

F'' is a valve for dividing the third chamber *d''*. This valve F is secured upon a valve stem or shaft *f''*, which extends through the casing B. The construction and operation of the valve F'' are similar to that already described for the valve F. Steam is admitted into the valve-chamber on one side of the valve F'' through the exhaust-steam passage *c'* from the second steam-cylinder. The steam is exhausted through a steam-port *c''* from the steam-passage *d''* into the open air or a condenser. Upon the outer end of the shaft *f''* is secured a geared wheel or disk G'', as shown in Figs. 8 and 12. Upon a shaft H'', mounted in suitable bearings upon the head *b'* and head *b''*, is secured a segment-arm *g''*, adapted to engage with the geared wheel or disk G''. Upon the shaft C is secured a cam-disk J'', and upon the shaft H'' is secured an arm *h''*, provided with a roller adapted to engage with the cam-disk J''. The cam-disk J'' is similar in form to the cam-disk J, except that its cam-surface *j''* is considerably longer, in order to hold the valve F'' open the necessary time. The operation of the parts just described is similar to that of the corresponding parts already described for operating the valve of the first cylinder. The shaft *f''* is supported in a bearing secured in the head *b'*, as shown in Fig. 8.

From the above description it is to be understood that steam is admitted to the first steam-chamber *d* and rotates the piston *e* therein. As the steam is exhausted from the first chamber *d*, it enters the second chamber *d'* and rotates its piston *e'*, and from the second cylinder it passes to the third chamber *d''* and rotates the piston *e''* therein. The second chamber is larger than the first employing a piston, which, in the instance I have given above, has an area four times that of the first piston-head, and the third chamber is larger than the second and employs a piston, which, in the instance above mentioned, has an area three times that of the second. If steam is admitted into the first chamber under a high pressure, it will be exhausted into the second under a lower pressure and will act expansively to rotate the second piston, and it will be exhausted under a still lower pressure and act expansively to rotate the third piston. The diameter of the first cylinder is considerably greater than that of the second, and the second than that of the third, thereby giving the second piston a shorter distance of travel, and the third a shorter than the second, thereby lowering the necessary speed of the piston-head according to the lower pressure of the steam and permitting the steam to act expansively. Steam under a high pressure will drive a piston expansively more rapidly than steam under a low pressure. By making the diameter of the succeeding cylinder less than that of the preceding one, and thereby lessening the distance of travel of the piston acted upon by steam under a lower pressure, the steam under lower pressure is given time to act expansively, and the steam in one cylinder under low pressure does not choke the engine, as might be the case were the cylinders of equal diameter and in case the pistons were driven at a high rate of speed. The back-pressure of the steam from the second cylinder acts against the piston-head of the first cylinder and the back-pressure of the third acts against the piston-head of the second cylinder, but the area of the third piston is greater than that of the second, and the second than that of the third, so that the force of the steam in the second and third chambers will drive the pistons therein. The valves F F' F'' divide their respective cylinders, so that the piston-heads are driven by pressure on one side only. The valves F F' F'' are operated simply to allow the piston-heads to pass them. The cam-disks J J' J'' are to be so arranged upon the shaft C as to open and close the valves F, F', and F'', respectively, at the proper time.

The details of construction of the cylinders D D' D'' and the casing B may be varied as may be desired.

The several parts may be lubricated by suitable lubricating devices, several of which are shown.

I do not limit my invention to the specific construction shown, nor to the proportions and dimensions of the parts hereinbefore given, as these may be greatly varied.

The chambers for the valves F F' F'' are bored out to receive the valves and a plate interposed on one side to fill the space between the shorter end of the valve and the chamber, as shown in Figs. 3, 4, and 5. As shown in Fig. 2, the disks E, E', and E'' are of less width than the chambers $d$ $d'$ $d''$, respectively, and the piston-heads $e$ $e'$ $e''$, respectively, so that the longer ends of the valves bear against the inner surfaces of their respective chambers.

What I claim as new, and desire to secure by Letters Patent, is—

1. In a rotary engine, the combination, with a steam-chamber and a rotating piston therein, of a second steam-chamber of less diameter than the first steam-chamber, a rotating piston therein, and a connection between the exhaust-port of the first steam-chamber and the admission-port of the second steam-chamber, substantially as specified.

2. In a rotary engine, the combination, with a steam-chamber and a rotating piston therein, of a second steam-chamber of greater area and less diameter than the first steam-chamber, a rotating piston therein, and a connection between the exhaust-port of the first steam-chamber and the admission-port of the second steam-chamber, substantially as specified.

3. In a rotary engine, the combination, with a series of steam-chambers, a series of pistons and uninterrupted connections between the several steam-chambers, of a series of valves which divide the steam-chambers, a series of cams mounted upon the main shaft, and connections between the cams and valve-shafts, substantially as specified.

MATHEW JOHNSON.

Witnesses:
HARRY T. JONES,
ALBERT H. ADAMS.